Figure 1:
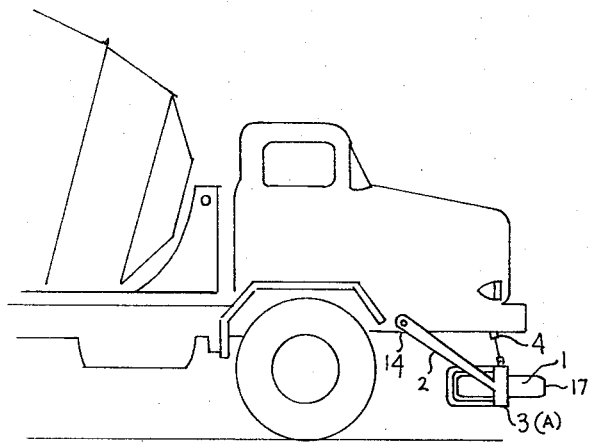

United States Patent [19]

Eshelman

[11] 3,847,427
[45] Nov. 12, 1974

[54] SHIFTABLE SHOCK ABSORBING TIRE BUFFER

[76] Inventor: Cheston Lee Eshelman, 621 N.E. 30th Ter., Miami, Fla. 33137

[22] Filed: Dec. 1, 1972

[21] Appl. No.: 311,336

[52] U.S. Cl............ 293/19, 224/42.04, 224/42.21, 224/42.23, 293/69 R, 293/71 P, 293/89
[51] Int. Cl. ... B60r 19/10, B61f 19/04, B61g 11/12
[58] Field of Search ............ 293/19, 71 P, 73, 69 R, 293/71 R, 89; 224/42.04, 42.05, 42.21, 42.23

[56] References Cited
UNITED STATES PATENTS

| | | | |
|---|---|---|---|
| 643,199 | 2/1900 | Porter et al. | 293/19 |
| 2,131,746 | 10/1938 | Morrison | 224/42.04 X |
| 2,196,225 | 4/1940 | Morrison | 224/42.04 |
| 3,502,362 | 3/1970 | Eshelman | 293/19 |
| 3,603,633 | 9/1971 | Eshelman | 293/19 |

FOREIGN PATENTS OR APPLICATIONS 4,274   12/1904   Great Britain .................. 293/19

Primary Examiner—M. Henson Wood, Jr.
Assistant Examiner—Howard Beltran
Attorney, Agent, or Firm—Nelson M. Ellison

[57] ABSTRACT

In a highway type motor vehicle, a vehicle wheel and wheel mounted pneumatic tire positioned in the front or rear of the vehicle, with the wheel and tire substantially parallel to the highway surface about the height of a standard automobile bumper and having means for supporting the approximate center and rear portion of said tire and wheel securely in a housing by strut members being connected from the housing to the frame of the vehicle so that a forwardly portion of the tire and wheel will act as an air bumper with means to raise and lower the height of said wheel and tire in its housing and means to retract said tire and wheel and housing up and out of the way by means of a control operated by the driver inside the cab or passenger compartment of the vehicle and/or having no means at all for raising and lowering the tire, wheel and housing from a predetermined fixed position built in the vehicle structure.

6 Claims, 12 Drawing Figures

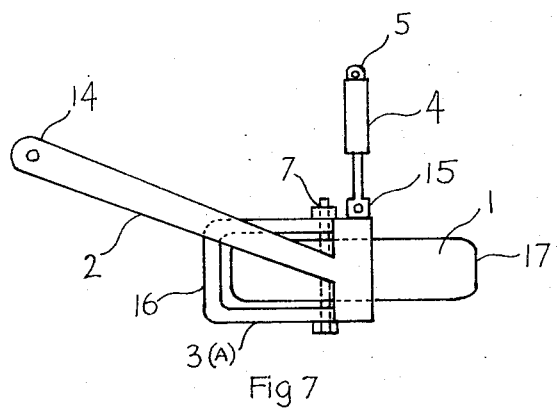
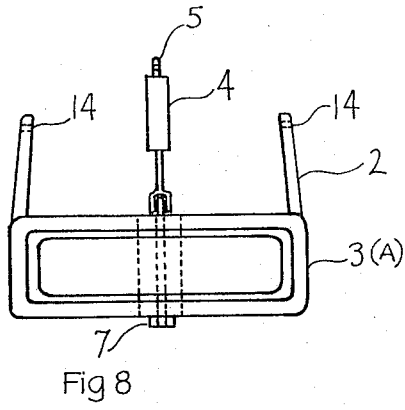
Fig 7 / Fig 8
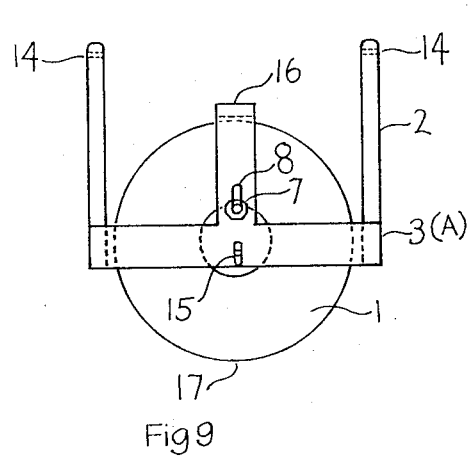
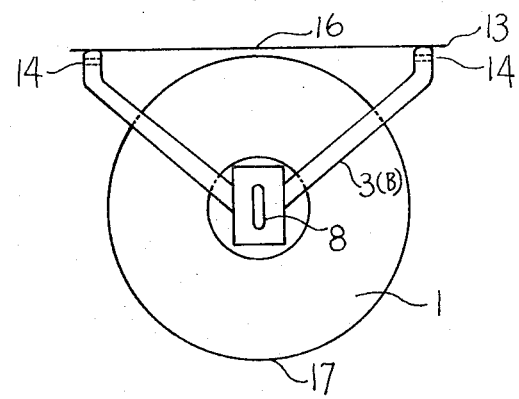
Fig 9 / Fig 10
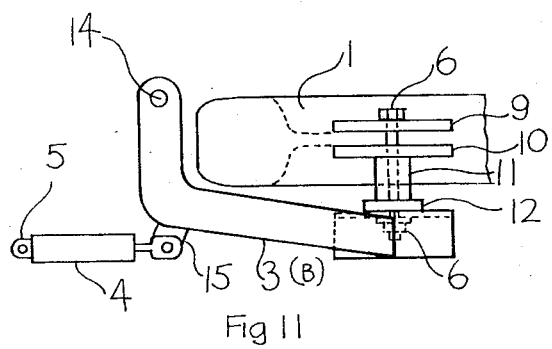
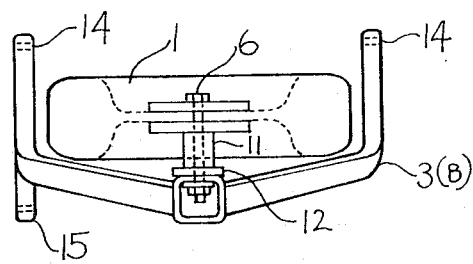
Fig 11 / Fig 12

SHIFTABLE SHOCK ABSORBING TIRE BUFFER

This application contains similar subject matter to that disclosed in my copending Application Ser. No. 228,035; filed Feb. 22, 1972.

My invention relates to an improvement in an air bumper for a highway vehicle using a pneumatic tire and wheel, mounted to the front or rear of the vehicle so that it will operate to absorb the energy of a collision, to offer "crash-worthiness," and to protect the occupants from death or injury. Tires can be spaced either singular in the middle or dual side by side in their housings.

With the ever-increasing use of express highways and the high cruising speed of modern automobiles plus the increased number of vehicles on the roads, there is a steady increase in traffic collisions with many deaths and serious injuries due to high speed collision with a barrier or head-on collision into an oncoming vehicle. One can hardly read a newspaper or watch the news on television without seeing a head-on collision of an automobile resulting in fatalities and injuries.

With all of the developments in modern passenger automobiles, trucks, busses, and station wagons, including the engines and bodies, the bumpers have been neglected by the industry. The modern bumper has been found to be as ornamental feature rather than what its name implies.

Most large truck bumpers are so high that they offer no protection in a collision with a passenger automobile. In fact some trucks such as concrete trucks have the bumper level up to the windshield of a car. Most large trucks including semi-trailers are so high in the rear that cars have been known to run completely under them, decapitating the occupants in the car. A good example of this was Jane Mansfield, movie star, and passengers some years ago, when all in her car were instantly killed when they ran underneath the rear of a parked truck.

The standard pneumatic tire and pressed steel wheel are very rugged and will resist being compressed out of their round shape. In most serious accidents, where the vehicle body is compressed out of shape and the engine is torn from its mounts, the spare tire and wheel are not damaged, nor are the wheels on the vehicle.

There are between 26 and 39 inches of absorption material, measured along a diameter of the wheel, consisting, in order, of a layer of rubber and cord, a layer of compressed air, a pressed steel wheel, another layer of compressed air, and another layer of rubber and cord. All these layers must be collapsed before the struck object can reach the main body or cab of the vehicle.

The advantages of this thickness of absorption materials are obvious in absorbing the energy of collision and decelerating the vehicle whereby fatalities, serious injuries and property damage are reduced by an estimated 50 percent. Tests have shown that a car equipped as described above can drive head on into a concrete wall at 40 miles per hour and not break the headlights.

It is an object of my invention to supply an absorption device which I have named the "air bumper." This device will absorb the energy of a collision to an extent far greater than is possible with a pressed steel, chrome plated bumper or a bumper too high to mesh with other bumpers.

It is a further object of my invention to provide small, medium, and large automobiles, trucks, busses, and station wagons with the disclosed air bumper mounted as described.

It is a still further object of my invention to move the spare tire and wheel from the trunk of the vehicle or other storage space and to mount them on the vehicle in front and substantially parallel with the road surface.

It is another object of my invention to so mount the wheel on the front of the vehicle that it will be interposed between the vehicle and any barrier with which a collision may occur.

It is yet another object of my invention to provide the air bumper with a removable cover to protect it from the elements and to place a removable guide on it to aid the driver in operating the vehicle.

It is yet another object of my invention to provide means for raising or lowering the tire and wheel and housing so that it can be retracted out of the way.

It is yet another object of my invention to provide pneumatic tire and wheel air bumpers for trucks so that they are standard bumper height of automobiles.

Further objects of the invention may be apparent by reference to the accompanying detailed descriptions and drawings in which:

FIG. 1, Type (A) is a side view of a truck that I will designate as Type (A) with a long overhang in front and the wheels and high bumper such as a concrete mixing truck and the air bumper is lowered to meet the height of a car bumper.

Figure 2:
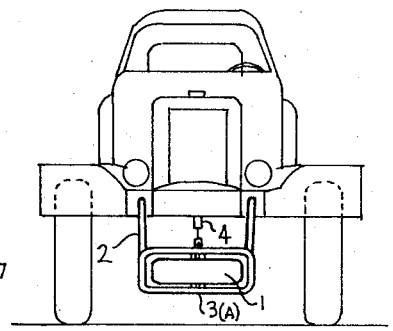

FIG. 2, Type (A) is the front view of FIG. 1.

Figure 3:
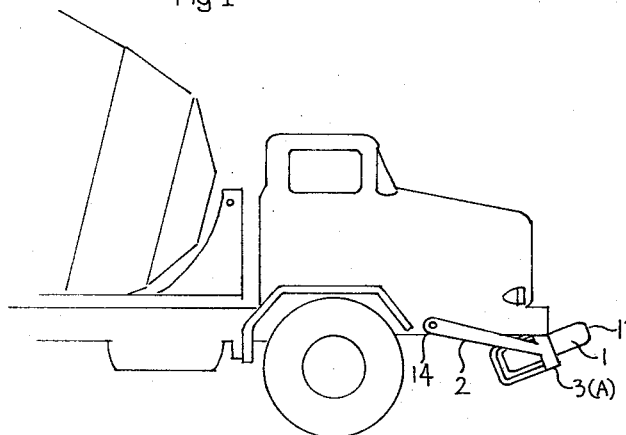

FIG. 3, Type (A) is the side view of a concrete truck with the air bumper raised to clear obstructions in off road driving.

Figure 4:
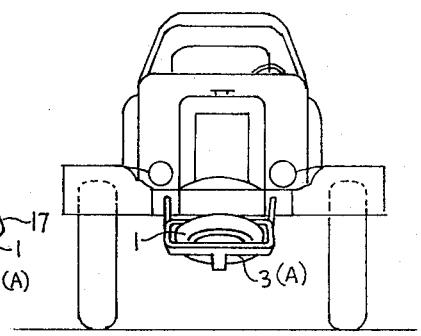

FIG. 4, Type (A) is the front view of FIG. 3.

Figure 5:
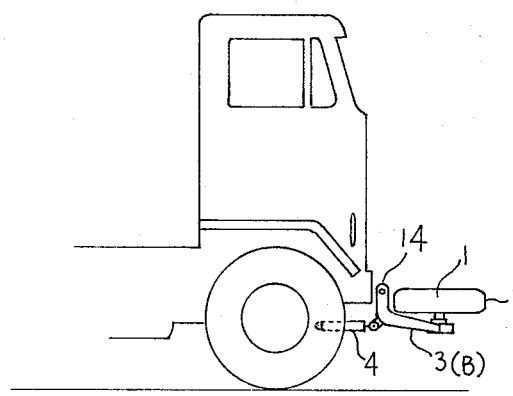

FIG. 5, Type (B) is the side view of a truck that I will designate as type (B) with a short overhang in front of the wheels such as a tractor to pull a trailer truck. This view shows the air bumper lowered to horizontal position to meet the height of a car bumper.

Figure 6:
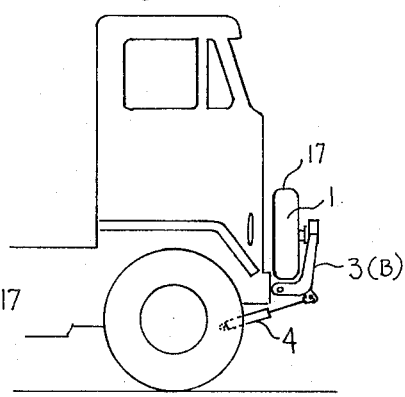

FIG. 6, Type (B) is the side view of FIG. 5 show the air bumper raised to the vertical position for clearance in parking or other tight clearance.

FIG. 7, Type (A) is the side view of the air bumper assembly for truck Type (A).

FIG. 8, Type (A) is the front view of FIG. 7.

FIG. 9, Type (A) is the top view of the air bumper assembly for a truck Type (A).

FIG. 10, Type (B) is the top view of the air bumper assembly for Truck Type (B).

FIG. 11, Type (B) is the side view of FIG. 10.

FIG. 12, Type (B) is the front view of FIG. 10.

1 is the tire and wheel that fits into the housing 3. This housing fits around the center and rear portion of the tire and wheel allowing the front portion to be exposed for bumping and absorbing energy in a collision. This housing can be made out of structural steel members welded together or a pressed steel shape out of sheet metal, and it is held in position by strut members 2 which are fastened to the frame of the vehicle and the housing by hinge bolts 14. At the rear of the housing there is a stop 16 which prevents the rear tread of the tire from moving aft beyond the stop 16. When the front tread 17 of the tire comes in contact with an obstruction it tends to push the tire and wheel aft squeezing the air in the front profile and air in the rear profile equally up against the housing stop 16. Thus it becomes an air bumper. An actuating mechanism such as a hydraulic cylinder 4 raises and lowers the air bumper. It is lowered for highway travel to act as a bumper for cars and raised for clearance in rough terrain. A fitting 15 for attaching the cylinder 4 is provided on the housing 3 (A) and (B). The other end of the cylinder 5 attaches to the frame of the vehicle. A retaining bolt 7 goes through the housing and large center hole in the wheel to prevent the tire and wheel from falling out or being stolen. The strut members 2 pivot on the hinge bolts 14 at the frame of the vehicle.

The housing 3 (B) is for vehicles type (B). The housing 3 (A) is for vehicles Type (A). The stop 16 would be the front structure hard point of the vehicle 13 such as a flat bumper or frame surface. The slotted aperture or hole 8 allows the tire and wheel to move aft in the housing on impact as previously described on type (B) vehicles. The wheel in the tire 1 is clamped between the top hub plate 9 and the bottom hub plate 10. This is held in place by the king pin 6 that passes through the slotted hole 8 in the housing 3 (B). The spacer 11 and flange 12 all move aft together on top of the aperture 8, when the tire meets with an obstruction and is forced aft upon impact as previously described.

My housing and mounting struts members are also intended to be used in a fixed position, without the use of the actuating mechanism 4. Thus the cylinder of the mechanism would be replaced by a rigid strut member holding the tire and wheel and housing in substantially a horizontal position to the road at about the bumper height of a car passenger. Said position being maintained by means of the strut members running from the vehicle frame to the housing, to accommodate application of my invention to cars, busses, station wagons and trucks that do not require the raising and lowering feature.

Having thus described my invention, I claim:

1. In an automotive highway vehicle having a front end, a carrier frame, strut members connected at one end to said frame and at the other end being pivotally connected to said vehicle front end, means for rigidly and removably mounting a vehicle wheel and wheel-mounted pneumatic tire in said carrier frame, a wheel and pneumatic tire mounted on said mounting means, and means connecting said vehicle front end and said carrier frame for pivotally moving said carrier frame and wheel and tire between a lowered operative bending position substantially parallel with the highway surface and a higher inoperative storing position non-parallel with the highway surface.

2. The invention as set forth in claim 1 wherein said carrier frame includes an elongated aperture, a stop rearwardly of the aperture and a sliding hub in the aperture for carrying the wheel and tire.

3. The invention as set forth in claim 2 wherein the wheel and tire when mounted on said sliding hub extends outwardly and forwardly of the carrier frame whereby said tire will be forced back against the stop when the vehicle strikes an object in front of it.

4. The invention as set forth in claim 1 wherein there is a control means adjacent to an operator's position in the vehicle for activating said means for pivotally moving said carrier frame between operative and inoperative positions.

5. The invention as set forth in claim 4 wherein the inoperative position of the carrier frame is partly under the front end of the vehicle.

6. The invention as set forth in claim 4 wherein the inoperative position of the carrier frame is in front of the front end of the vehicle.

* * * * *